United States Patent

[11] 3,630,566

| [72] | Inventor | Chester J. Barecki<br>Grand Rapids, Mich. |
|---|---|---|
| [21] | Appl. No. | 36,842 |
| [22] | Filed | May 13, 1970 |
| [45] | Patented | Dec. 28, 1971 |
| [73] | Assignee | American Seating Company<br>Grand Rapids, Mich. |

[54] END-SUPPORTED VEHICLE SEAT
7 Claims, 11 Drawing Figs.

[52] U.S. Cl. .................................................. 296/63,
105/345, 297/244, 297/450, 297/454
[51] Int. Cl. .................................................. B60n 1/00
[50] Field of Search .................................................. 296/63, 64,
28 A; 244/118 P, 122; 105/345; 297/450, 277,
280, 244; 248/317; 108/149; 5/9

[56] References Cited
UNITED STATES PATENTS

| 992,164 | 5/1911 | Christianson.................. | 296/28 A UX |
| 2,124,003 | 7/1938 | McDonnell et al. .......... | 244/118 P |
| 3,020,087 | 2/1962 | Macklin ....................... | 297/244 |
| | | FOREIGN PATENTS | |
| 72,538 | 5/1951 | Denmark..................... | 296/63 |
| 186,382 | 9/1922 | Great Britain................ | 296/64 |

Primary Examiner—Benjamin Hersh
Assistant Examiner—John A. Pekar
Attorney—Dawson, Tilton, Fallon & Lungmus ABSTRACT: One end of a vehicle seat is anchored at spaced points to the wall of the vehicle and the other end at the aisle is suspended from the ceiling by a suspension rod or tube braced against turning.

INVENTOR
Chester J. Borecki

BY Dawson, Tilton, Fallon
and Lungmus
ATTORNEYS

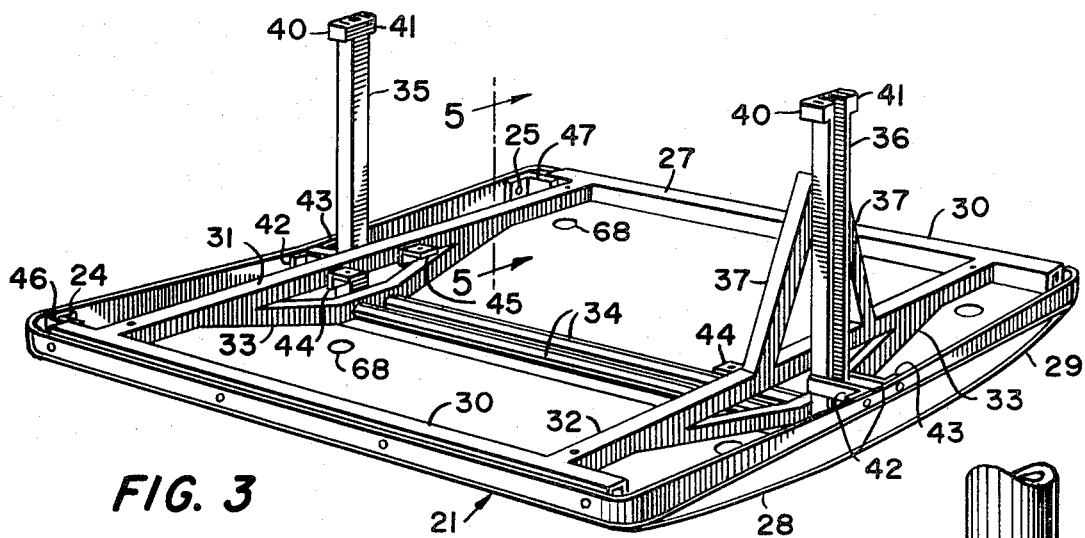
FIG. 3
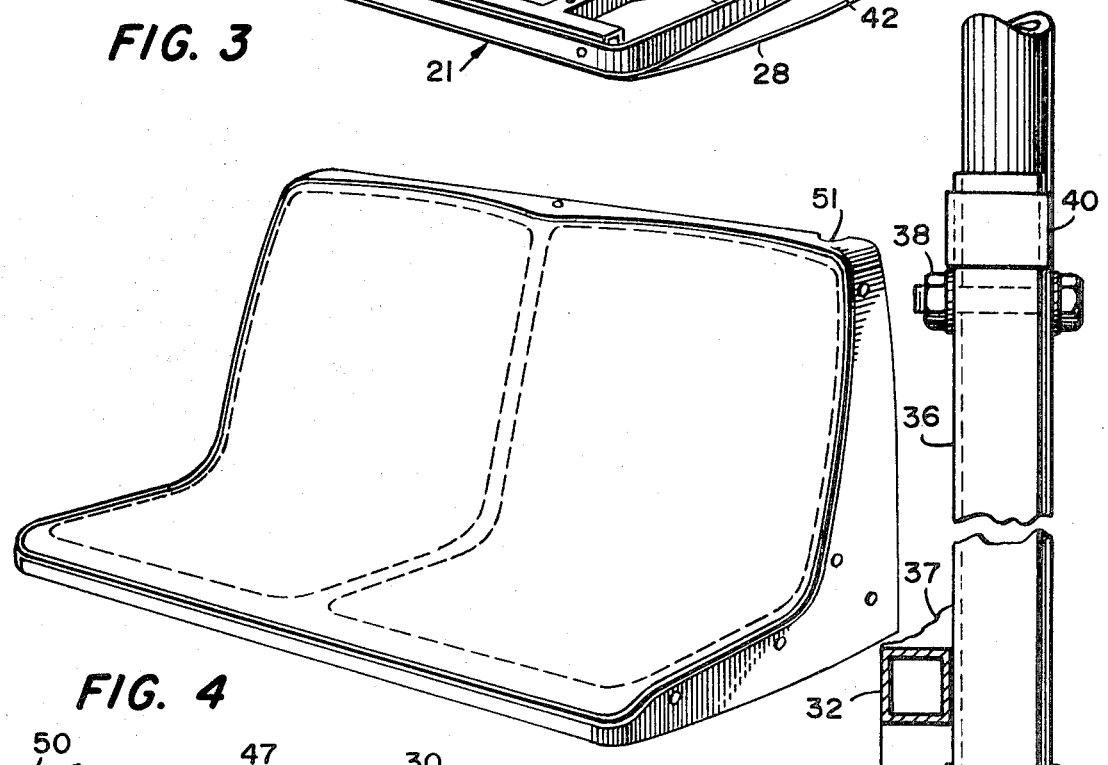
FIG. 4
FIG. 6
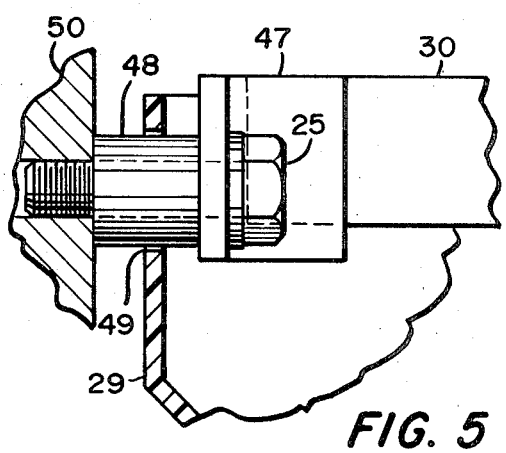
FIG. 5
INVENTOR
Chester J. Barecki
BY Dawson, Tilton, Fallon
and Lungmus
ATTORNEYS INVENTOR
Chester J. Barecki BY Dawson, Tilton, Fallon
and Bungmus
ATTORNEYS INVENTOR
Chester J. Barecki BY Dawson, Tilton, Fallon
and Lungmus ATTORNEYS

END-SUPPORTED VEHICLE SEAT

BACKGROUND AND SUMMARY

If seats in a vehicle could be suspended at their ends above the floor so that the floor area is open, cleaning of the vehicle could be accomplished in a matter of minutes. For example, with such a structure, a gang-type sweeper could clean the vehicle in one passage down the aisle.

Serious problems however, are presented in the suspending of the seat from its ends, and particularly for supporting the aisle end of the seat. For example, if the aisle end of the seat is supported by a suspension rod or element from the ceiling and a passenger should sit on a corner of the seat near the aisle, there is a tilting action tending to turn or rotate the rod, and to withstand such twisting or turning stress the cost of reinforcing the ceiling support would be prohibitive. Ceiling rods have been employed for supporting seats, but such rods have always been extended to the floor so that there is no turning stress and the only stress is that of bowing the rods. Bowing stress can be readily absorbed by a ceiling support. However, when the ceiling rods are extended to the floor, there is no longer an open floor and the difficulties of readily cleaning the vehicle remain.

I have discovered that a seat can be end-suspended in a stable and sturdy fashion by utilizing in conjunction with wall anchors for the wall seat end, a suspension rod which terminates at its lower end in the aisle seat end and with brace means resisting turning movement of the rod. Such bracing means converts irregular seating stress into a bowing of the rods and such bowing stress can readily be absorbed by the ceiling supports. Further, by employing two-way seats for four passengers in combination with a single suspension rod, a wide wall seat end lies adjacent the wall and anchor means here are spaced so widely apart that they provide sturdy wall end support.

The chair is completely enclosed by a plastic shell so that there are no protruding parts to catch on anything that is passed under, around, or over the chair, and there are no recesses for accumulating trash. At the same time, the plastic shell is supported throughout by frame members which are supported within the braced seat structure.

DRAWINGS

In the accompanying drawings:

FIG. 1 is a perspective view of a four-passenger chair suspended on its aisle side by a rod which may be tubular or solid;

FIG. 2, a similar perspective view with the near plastic seat shell removed to expose the supporting metal framework;

FIG. 3, a perspective view of the chair base with the plastic seat shells removed;

FIG. 4, a perspective view of one plastic seat shell showing the rivets on one side for attachment to the metal frame inside;

FIG. 5, a broken fragmentary view taken at line 5—5 of FIG. 3 and showing the means for attaching the chair frame to the wall;

FIG. 6, a broken sectional view, the section being taken as indicated at line 6—6 of FIG. 2 and showing how the chair frame aisle side column is attached to the supporting rod suspended from the ceiling;

FIG. 7, a perspective view of the back side of the seat shown in FIG. 4;

FIG. 8, a rear perspective view of the tubular inside frame carried inside of the seat shown in FIG. 7;

FIG. 9, a perspective view of a modified form of tubular frame equipped to give more support to the sides of the plastic seat shell;

FIG. 10, a perspective rear view of a seat showing the modified inside frame and the giving by it of added support to the side of the plastic seat shell; and FIG. 11, a sectional view, the section being taken as indicated at line 11—11 of FIG. 1 to show the attachment points of the seats to the supporting under frame.

DETAILED DESCRIPTION

Figure 1:
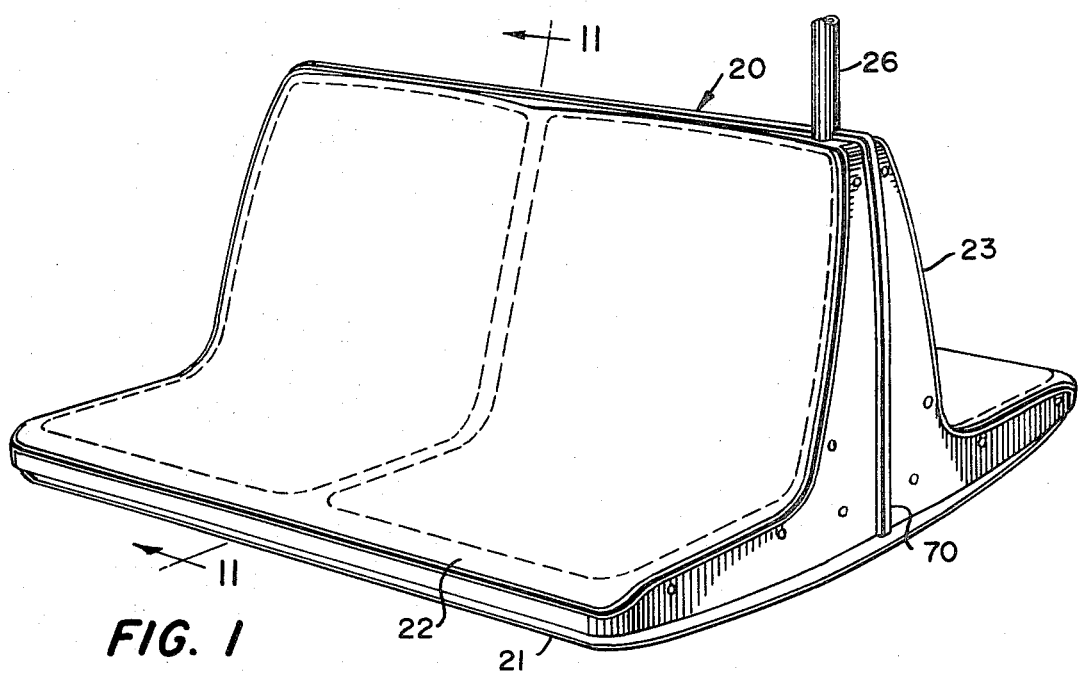

As shown in the drawings, I have provided a base equipped with rising columns and with the aisle side column hollow for receiving a suspension rod which is preferably tubular and which is locked within the column for suspending the aisle side of the seat. Upon the frame thus shown I provide an inner frame for carrying a plastic shell seat. The seat may be single or double but I prefer a double-seat structure with the seats back-to-back because this provides an extremely wide frame structure alongside the wall and thus very widely spaced attachment means for anchoring the seat end to the wall. In the structure, I also provide brace means which in the case of unusual stress, as, for example, the stress imposed by a passenger sitting on a corner of the seat adjacent the aisle, directs such stress against the suspension rod to cause a bowing deflection, if there is any deflection, rather than a turning motion.

Referring to the drawings, the four-passenger transverse vehicle seat 20 consists of three main parts: a supporting under structure 21 and two seat sections 22 and 23. The seat is attached to the wall in two places, namely, at 24 and 25, and is suspended from the ceiling by a tube 26 at the aisle side of the unit.

As shown best in FIG. 3, the supporting under structure 21 consists of a frame 27 encased in two plastic shell halves 28 and 29. Frame 27 consists primarily of a horizontal frame of square tubing with two side members 30, a wall side member 31, and an aisle side member 32 made rigid by bracing 33, and with two stabilizing round stretchers 34 supporting a wall side column 35 of square tubing and an aisle side column 36 which is hollow. The aisle side column 36 is provided with two braces 37 shown best in FIG. 3 and which are welded to the column 36 at their top and then diverged, extending laterally toward the sides of the frame. Thus, stresses applied upon a corner of the seat at its aisle side will be transmitted through the braces, and twisting or turning of the column 36 will be resisted.

The aisle side column 36 is a channel so that the suspending tube 26 will fit into it and can be attached at the top 38 and bottom 39 with bolts and nuts, as shown in greater detail in FIG. 6.

Figure 11:
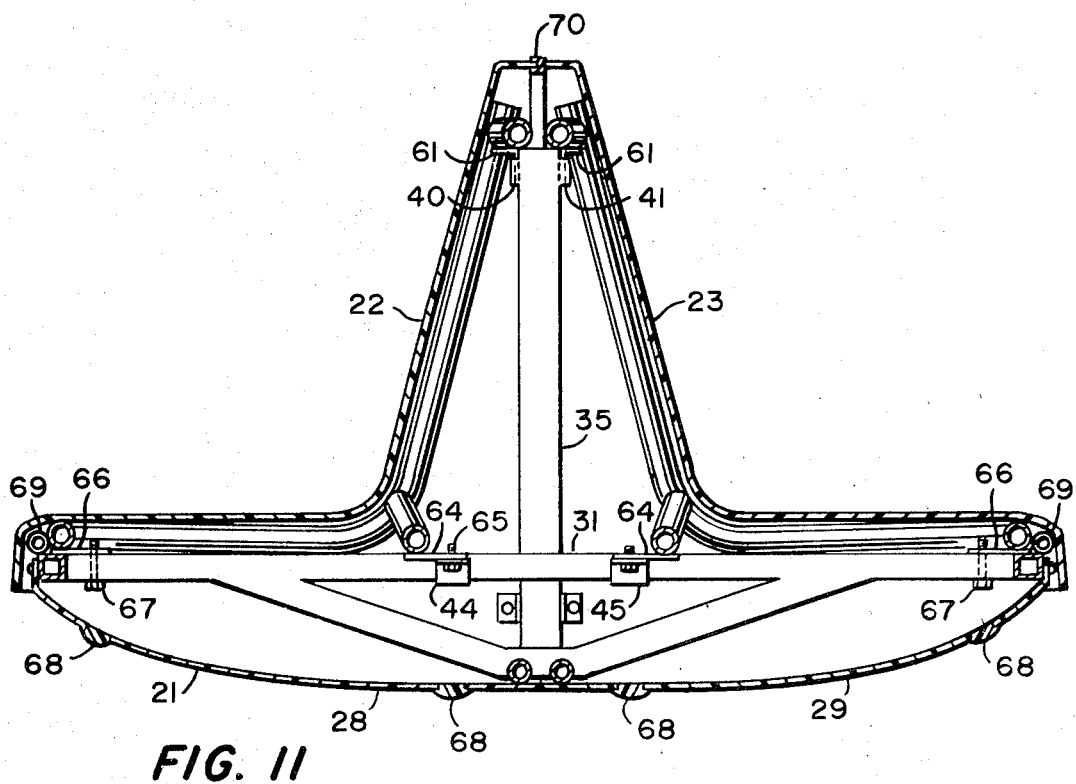

At the top of each column there are two brackets 40 and 41 into which upper projections 61 of the seats 22 and 23 fit, as shown best in FIG. 11. On each side of each column there is a bracket 42 and 43 supporting the side of the lower shell halves 28 and 29. On the inside surfaces of the wall side frame member 31 and the aisle side frame member 32 there are two angles 44 and 45 for supporting the lower inner plates 61 of the seats 22 and 23.

At the wall end of the side members 30 there are attachment angles 46 and 47 for the attachment of the structure 21 to the wall 50 with bolts 24 and 25 and tubular spacers 48, as shown best in FIG. 5. The plastic shells 28 and 29 have holes 49 for the spacers so that there are no bearing points on the shell halves.

The seat sections 22 and 23 are identical until the notch 51 is cut for the suspending tube 26, which makes each shell a left or a right, the notch being shown in FIG. 4. The notch is not shown in FIGS. 7 and 10 because the seat section shown in each figure could be either seat 22 or 23.

Figure 2:
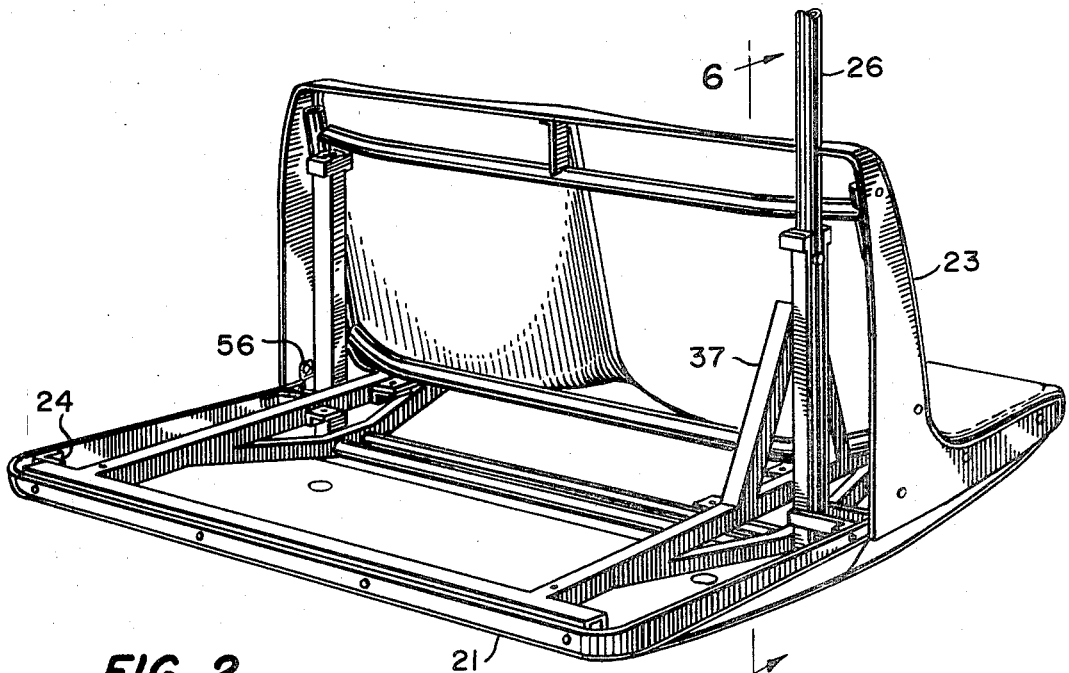
Figure 7:
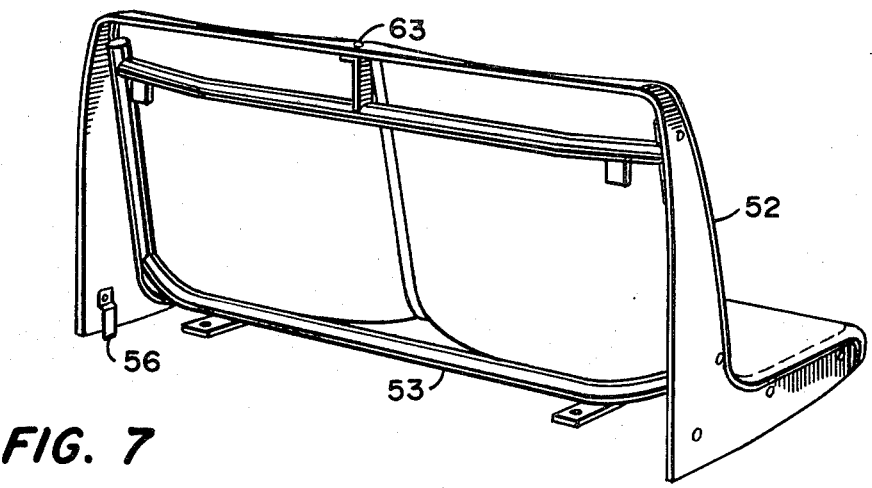
Figure 8:
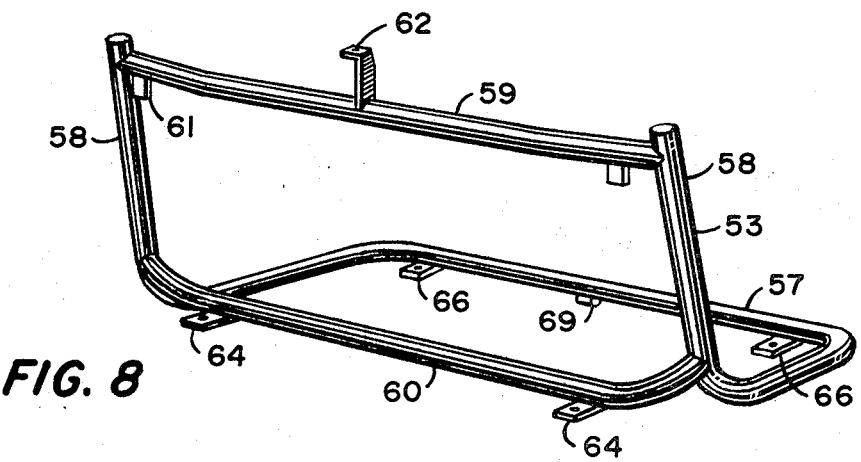
Figure 9:
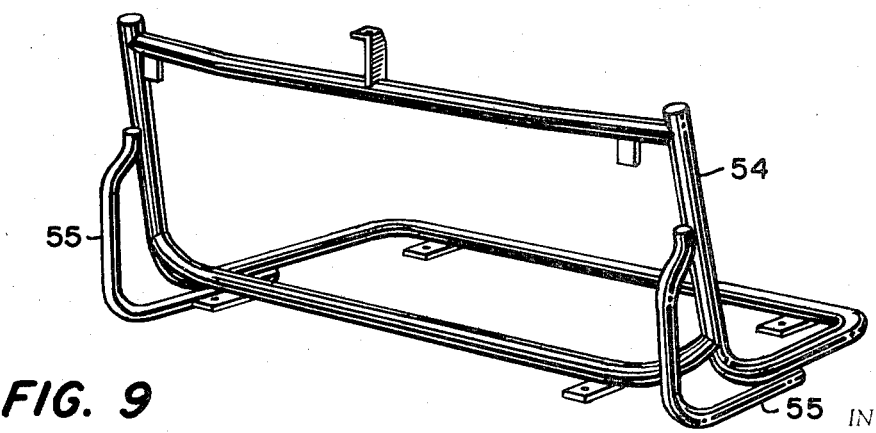
Figure 10:
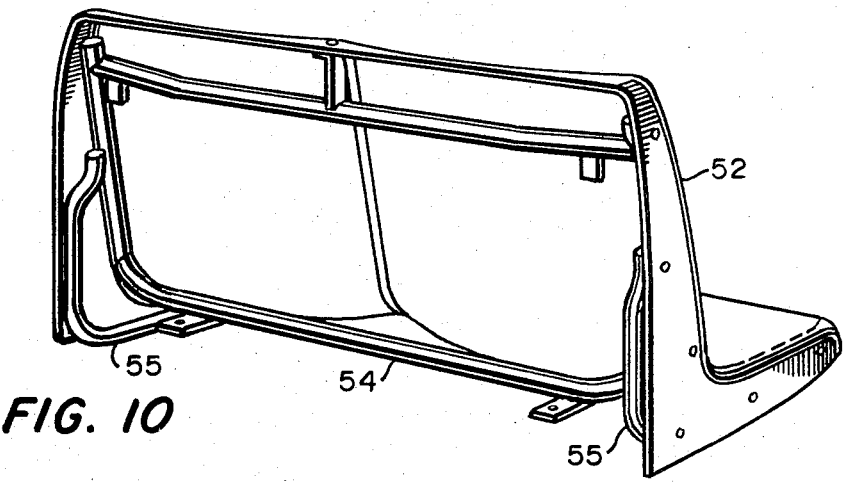

Referring to FIGS. 7–10, the seat shell 52 fits over a tubular frame 53 or the modified form 54. The difference between frames 53 and 54 is an added curved tube 55 to give added support to the sides of the shell 52, as shown best in FIG. 10. There is also a slight difference in the pattern of the attachment rivets when the curved tube 55 is used. The rivet locations are shown in FIGS. 7 and 10 and the holes in the sides of the frames are shown in FIGS. 8 and 9. When the curved tube 55 is used, there is no need to use the clips 56 which hold the seat shell against the lower shell half, as shown in FIG. 2.

Referring to FIG. 8, the tubular frame 53 consists of a generally U-shaped tube 57 which lies flat with the ends 58 pointing upward. There is an upper stretcher tube 59 and a lower stretcher tube 60. There are two projections 61 welded to the bottom of the upper stretcher tube which slip into the brackets 40 or 41 at the upper ends of the columns 35 and 36, as shown in FIG. 11. There is also an angle 62 welded to the upper side of the stretcher tube to support the back of the seat shell. A rivet 63 is inserted to attach the shell to the angle.

There are two lower inner plates 64 welded to the bottom of lower stretcher tube 60 which attach to the angles 44 or 45 of the lower frame members 31 or 32, with bolts 65, as shown in FIG. 11. Along the lower front portion of the U-tube there are two outer plates 66 which attach to the side members 31 and 32 with long bolts 67. There is a plugged hole 68 in the lower shell halves 28 and 29 just above each bolt 65 and 67.

At the center point of the front edge of the U-tube 57 there is a small spacer 69 to support the front edges of the plastic shell from below. Referring to FIGS. 8 and 11 there are no rivets which might loosen and snag clothing.

In the final assembly of the chair unit into the vehicle, a small channel-shaped plastic strip 70 is inserted between the seat sections 22 and 23 to keep them from rubbing, and this is shown best in FIGS. 1 and 11.

The invention herein may be used with single seats or with a back-to-back combination seat, but I prefer the back-to-back combination arrangement because of the extreme width of the base frame bordering the wall and permitting attachment of the frame to the wall at widely spaced areas.

While in the foregoing specification I have set out specific structure in considerable detail for the purpose of illustrating modifications of the invention, it will be understood that such details may be varied widely by those skilled in the art without departing from the spirit of my invention.

What is claimed is:

1. A seat structure adapted to be suspended from the wall and ceiling of a vehicle above the vehicle floor providing an aisle, comprising a frame having spaced anchor means for suspending an end of said seat upon a vehicle wall with the opposite end adjacent the aisle of the vehicle, a suspension tube adapted to be secured to the ceiling of the vehicle and terminating at its lower end in said seat end adjacent the aisle, a hollow column carried by said frame at the aisle seat end for receiving said tube, means for securing said tube to said column, and an inclined brace carried by said column and extending downwardly and laterally to said frame.

2. The structure of claim 1 in which a tubular seat support is mounted on said frame and a seat shell is mounted on said support.

3. The structure of claim 2 in which said tubular seat support is provided with brace extensions for supporting said seat shell.

4. The structure of claim 1 in which said hollow column is anchored at its bottom to said seat frame and at its upper portion by downwardly and laterally extending braces.

5. The structure of claim 1 in which said inclined brace extends toward an outer corner of said seat.

6. The structure of claim 1 in which said seat structure has a pair of seats back-to-back supported by said suspension tube at said aisle end.

7. The structure of claim 1 in which said seat structure is closed by seat shells.

* * * * *